Patented Oct. 13, 1953

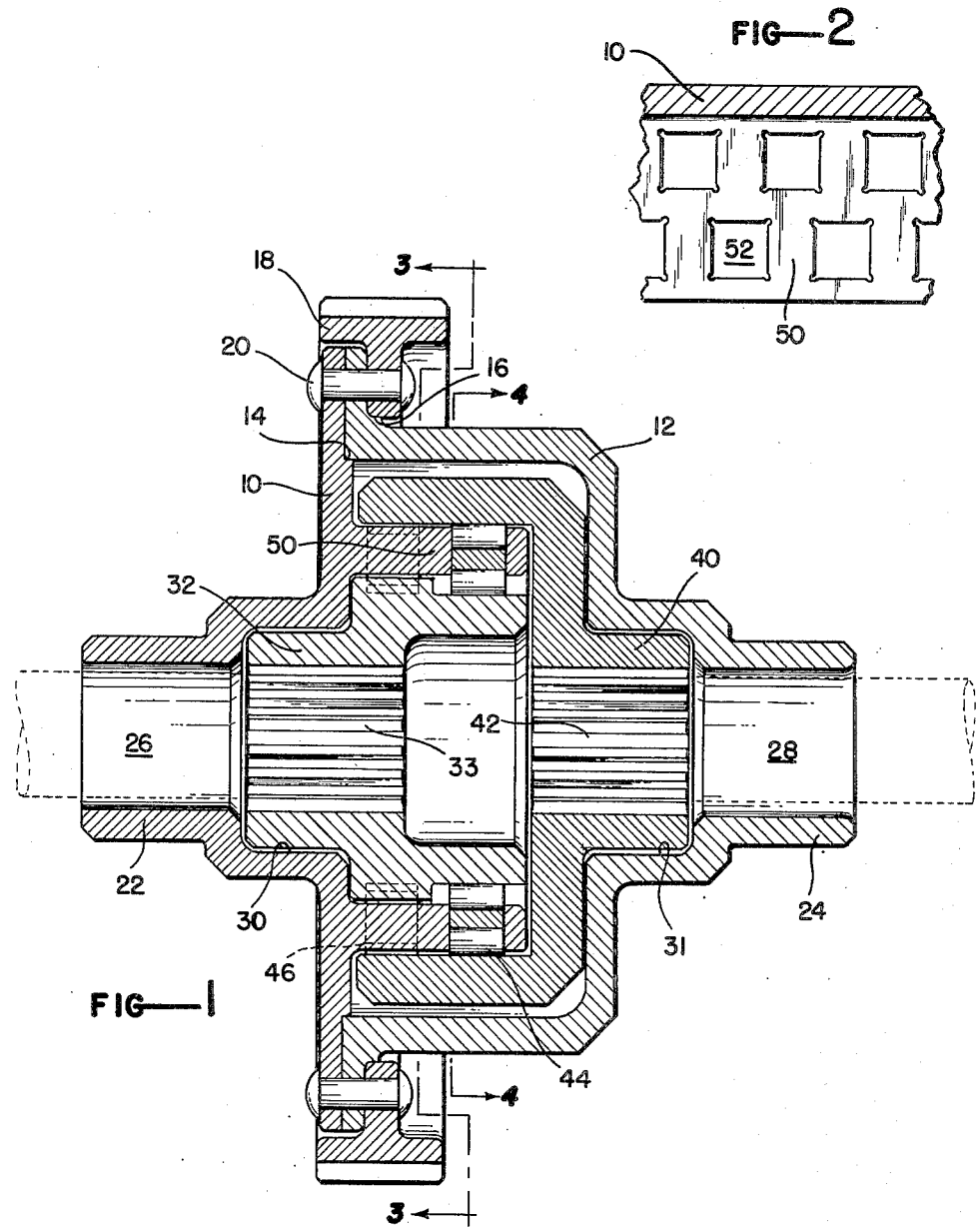

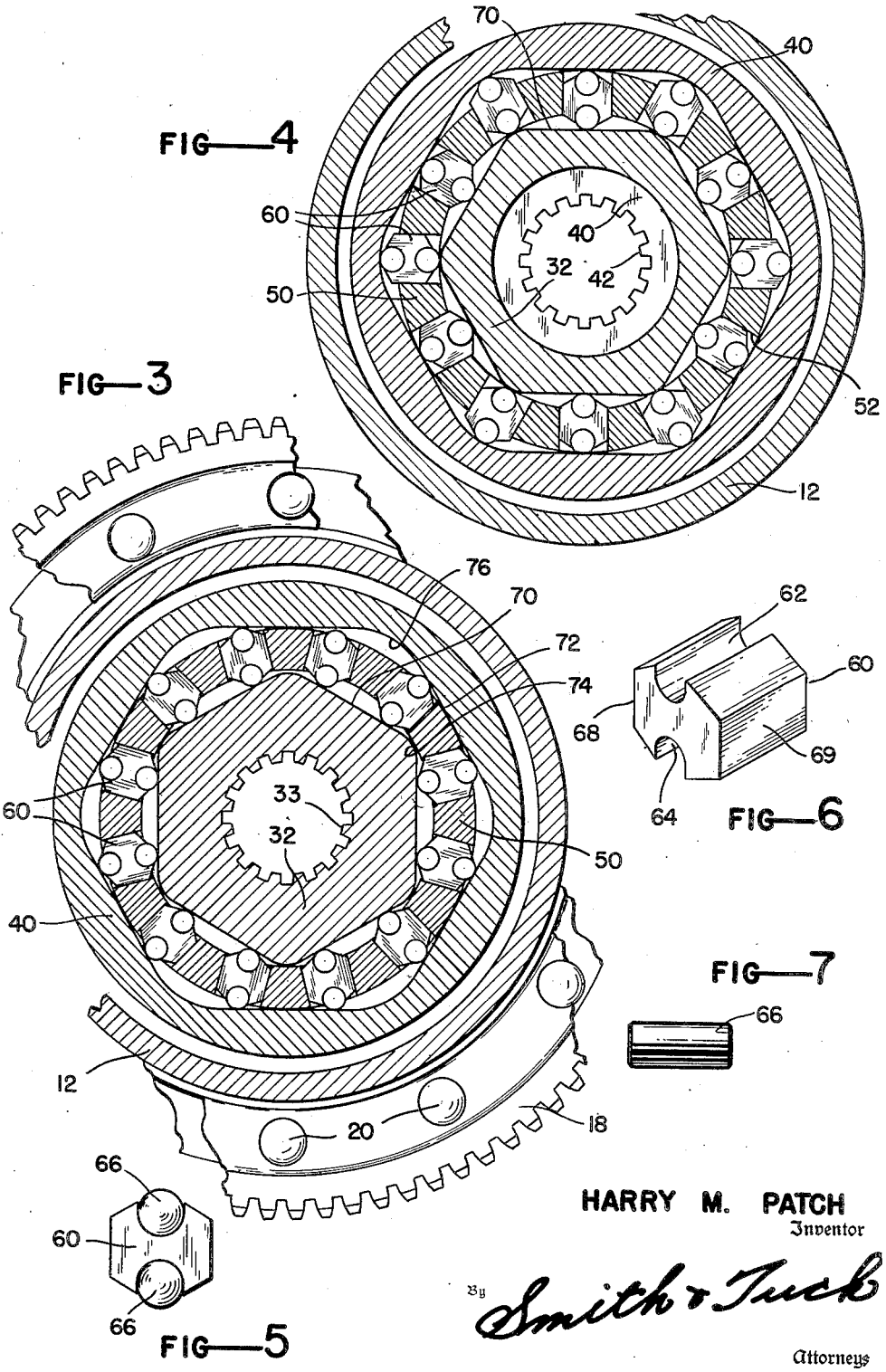

2,655,053

UNITED STATES PATENT OFFICE 2,655,053

TORQUE PROPORTIONING DIFFERENTIAL

Harry M. Patch, Seattle, Wash.

Application November 21, 1949, Serial No. 128,579

4 Claims. (Cl. 74—650)

This present invention consists of a plurality of external and internal multi-surfaced cams, having disposed between them a plurality of plungers, the opposite ends of which are engaged by the external and internal cam faces. These plungers are caused to revolve with the ring gear by means of a cage, which is fixedly secured to the housing carrying the ring gear. This present application is an improvement on the inventor's co-pending United States application, Serial No. 70,019, now Patent #2,627,760. This application has certain elements which are similar to the Robbins patents, Numbers 1,857,978 and 1,836,684.

In the past there has been considerable development in differential mechanisms which avoid the use of the conventional gearing commonly found in differentials, and which has provided a proportioning of the torque or power to the driving axles by means of cams and slidable members, which are disposed between the co-acting cam surfaces. Those differentials of the prior art which have been studied, have been relying upon the solid blocks of steel to transfer energy from one set of cams to the other, and as there is considerable sliding under load, it has been found very difficult to maintain an oil film between the sliding surfaces, with the result that excessive wear has been present and after wear has taken place, the differentials became noisy in use, and their efficiency considerably reduced. In this present differential, it is believed that I have provided rolling friction instead of sliding friction. It is desirable that the oil films can be maintained, particularly in view of the fact that a considerably increased number of transfer units have been employed so that the pressure resulting from the transfer of torque can be kept within the bearing pressures which will not rupture the oil film. It is believed a torque proportioning differential can be provided in which there will never be actual metal-to-metal contact, consequently long useful life and a high efficiency level can be expected.

The principal object of this present invention is to provide, in a gearless differential, a plurality of external cam surfaces and a co-acting internal cam surface for each of the external surfaces, and to provide a plurality of load transferring units between the co-acting cam surfaces so that pressure will be reduced to a level that will not disrupt the oil film relied upon to preserve the carefully determined tolerances of the equipment, as originally manufactured.

A further object of this present invention is to provide, in a cam type of differential, load transferring members in which the bearing surfaces occurring at each end of the transfer members will have inset hardened rollers, which will substitute rolling friction for the sliding friction formerly exerted.

A further object of this invention is to provide in a very economical construction, a differential which will maintain its effectiveness over long periods, and will transmit the driving power smoothly without vibration, and which will not develop harmful clearances through wear in use.

A further object of this invention is to provide in a cam type of power dividing differential, a plurality of cam surfaces, each having a plurality of transfer units disposed between the external and internal cam surfaces, so if one wheel loses traction the angularity of the cams are so favorably arranged that instead of one wheel losing its traction and spinning, it can revolve at an increased speed and still will produce effective driving effort in the wheel that has retained traction.

Further objects, advantages and capabilities will be apparent from the description and disclosure in the drawings, or may be compehended or are inherent in the device.

In the drawings:

Figure 1 is a sectional view taken along a diameter and at right angles to the normal driving axles, the axles themselves being shown in dashed lines only;

Figure 2 is a fragmentary sectional view showing the form and facing of the openings in which the drive transfer units or plungers are normally seated;

Figure 3 is a cross-sectional view taken along the broken line 3—3 of Figure 1;

Figure 4 is a cross-sectional view taken along the line 4—4 of Figure 1;

Figure 5 is an end view of one of the load transferring members or plungers;

Figure 6 is a perspective view of one of the load transferring members with the rollers removed therefrom;

Figure 7 is a side view of a typical roller as used in this equipment.

Referring more particularly to the disclosure in the drawings, the numerals 10 and 12 designate, respectively, the two halves of the housing of this differential. A machined shoulder is provided at 14 to insure the axial alignment of members 10 and 12, and a similarly machined seat 16 insures the axial alignment of the ring gear 18. The three elements, the two housing members 10 and 12 and gear 18, are secured together as by a plurality of rivets 20.

Housing members 10 and 12 have outwardly extending tubular portions 26 and 28 respectively, which serve as guide members for the driven axles and further serve as seats for the supporting anti-friction bearings, which have not been shown in these drawings, as this portion of the differential art is so well developed. Each of the housing members 10 and 12 is provided with interior bores 30 and 31 respectively, in which are disposed the cam elements. Clearance is provided so that the actual positioning is produced by the plunger and the cage in which they move and thus the load is equally distributed between the plungers.

In housing member 10 is positioned the external cam member 32, and adapted to co-act with this cam member is an internal cam member 40, similarly positioned within housing member 12. Each of the cam members is preferably splined as at 33 and 42 respectively to accommodate the splined ends of driven axles, which are indicated in Figure 1 by dashed lines. Each of the cam members, as 32 and 40, is provided with the same number of cam surfaces. Throughout the drawings this has been indicated as six such surfaces, although, it is believed, it will be apparent that this number may be varied, it only being essential that the same number are used in each of the external and internal co-acting cam pairs.

In order to provide maximum smoothness of power transfer when the differential is called upon to act as such, it has been found desirable to have two or more sets of the internal and external cams, and to have one of them in a staggered relationship with its similar cam. In Figure 1, one external cam is shown in solid line, as at 44, and the other external cam is shown in dashed line at 46. This same relationship is further illustrated in Figures 3 and 4.

Disposed between the two co-acting cam units is a tubular cage 50, this member is preferably formed as part of housing member 10 and, as such, will at all times be driven at the same speed and with gear 18. In Figure 2 is illustrated the arrangement of the load transfer member positioning openings 52.

Disposed within each of the openings 52 in the cage, are load transferring units or plungers which consist of the sliding block 60, each of which is grooved at top and bottom, and indicated at 62 and 64, to accommodate rollers 66. These blocks have bearing surfaces at 68 and 69, which have co-acting bearing surfaces in cage 50.

It has been found from trial, that a number of these load transfer units or plungers should be as great as the practical minimum dimensions will permit. The rollers 66 must be of a size to adequately carry their loads and to revolve freely so that they will not slide and cause a rupture of their protective lubricating oil films. Throughout the present showing, two of these transfer units have been employed for each set of cam faces.

In reference to Figures 3 and 4, it will be noted that the cam faces, as 70 on the external cam members, and 72 on the internal cam members, have a portion that is of substantially similar extent. The external cam members have an arc at each corner of the cam, as at 74 and correspondingly drawn from the same center or with a shorter radius, the internal cam member has an arc joining the cam surfaces, which is of approximately the same angular extent. It is further to be noted that the actual cam faces are shown as flat planes, this is a desirable arrangement, but not essential. It is essential, however, that the cam surfaces be similar to and equi-distant when they are in the same angular relationship.

Method of operation

The driving plungers 60, consisting of a block with a roller in its opposite ends, are 24 in number, in two rows, spaced thirty degrees apart, 12 in each row with those in one row set fifteen degrees in advance of those in the other row. There are always six plungers taking the drive. They are all in the same relative positions on each of the six cam faces of the same row on the inner cam, as well as on the cam faces of the outer cam. The plunger nearest the cam corner toward which the plunger is being driven by the cage, always takes the drive load as well as the compression load between the inner and outer cam faces. This is because the plunger is being driven by the circular cage 50, but forced to go in a tangent by the cam face, so the first five degrees travel from cam face center, on a tangent, is a little greater than the length of the same five degree arc of the cage circle. However, each additional five degree travel increases this difference, so the load on the plungers increases as it approaches the cam face center, and decreases as it approaches the cam face corner, due to the angle of the cam face presented to it. The lesser angle produces the greater crushing load and the greater angle produces less crushing load, approaching a ninety degree angle which would produce only drive load. As the plunger starts around the cam corner, the load is transferred to the wedge next in angular spacing fifteen degrees ahead or back and in the other wedge row. As example, with an inner cam of about 3⅞ inch diameter across the flats, an outer cam of about 5⅛ inch diameter across flats and a torque of about 10,000 foot pounds, the highest compressive load per plunger would be at an angle of about ten degrees from the cam face center, with a load of about 25,000 pounds. The lowest load would be about 6,500 pounds, compressive, at about twenty-five degrees from cam face center, or at the point where the wedge is about to pass around the cam corner. The drive load is more nearly constant, at about 5,000 to 7,000 pounds as extremes.

In making a turn with a vehicle, the front wheels carry the front end of the vehicle out of its straight line of travel. This forces one of the rear wheels to travel faster than the other, as it has farther to go around the outside of the curve, than the one on the inside of the curve, and has the same time element in which to do it. This means the cam which is driving the outside wheel, must overrun the drive cage 50 and plunger 60 while the other cam underruns the cage and plungers while the cage forces the plungers in driving contact with these moving faces, which are moving in opposite directions relative to that of the driving cage and plunger. When on a straightaway drive with both rear wheels having the same rolling radius, the cage, plunger, and cams travel as a unit, with no relative movements of any of the parts. This allows the oil to be squeezed out from between the line contact of the plunger and the cam faces. If this plunger is in the form of a solid or one piece element, when turning action does occur, it often produces a decided and annoying ping, very like a hammer blow of steel-on-steel as it breaks loose from its unit position. This difficulty of breaking loose makes for hard steering, as the rear wheels try to keep the vehicle body straight and the turned front wheels are apt to slide rather than guide. The construction of this plunger overcomes that difficulty as the rollers 66, while having the oil substantially squeezed out between the line contact with the cam faces, still has its oil film between it and the plunger block, which presents a surface bearing equal to one-half the circumference multiplied by the length of the roller. As the turning action occurs, the roller can turn in its bearing and therefore no noise is produced because there is no dry line bearing sliding movement on the cams.

In running in a straightaway with a conventional differential, the side gears, pinions and spider turn as one unit, driving through a radius equal approximately to the radius of the side gears. With this differential the same is true, the radius is roughly that of the pitch line of the plunger. When making a turn, the drive is still through the same radius in both differentials, however, when traction is critically reduced on one wheel, the gear differential drive is still through the same radius, resulting in spinning the wheel. In this differential, under similar conditions, the driving radius also remains the same, excepting the two cams and wheels are driven together and at the same speed, unless or until the cam and wheel retaining traction, can force the plunger to travel in a radial movement, by moving down the cam's angular face, and, thereby forcing the other cam to turn faster than the first cam simply by its radial movement against the angular face of the second cam. This is similar to a wedge or inclined plane, which can support a high pressure perpendicular to its base without any movement, but increase of weight will finally overcome resistance to movement. This is in direct proportion to the angle of the plane to the weight or force. By proportioning the cams to the drive load of the plungers, the wheel losing traction can be forced in this manner to spin before 100 per cent overload has been applied to the wheel retaining traction and breaking its axle. This amount of slope is ascertained by taking the radius from the axis of the cam to the cam face center, or the cam face shortest radius, and subtracting it from the longest radius at the cam face corner. This will, in effect, give an everchanging angle from the greatest angle at the corner, down to the point where the plunger ceases to drive and another plunger takes over at another corner in the other row of wedges. This may be considered as similar to a logarithmic curve in action.

It is believed that it will be clearly apparent from the above description and the disclosure in the drawings that the invention comprehends a novel construction of a torque proportioning differential.

Having thus disclosed the invention, I claim:

1. In a power dividing differential, the improvement comprising: a housing formed of two housing members adapted to be secured in axial alignment, said housing members having axially aligned bearing seats formed, one on each of said members; a drive gear secured to said housing; an internal cam member journaled within one of said housing members; an external cam member journaled within the companion housing members; a multiplicity of plungers disposed between said internal and said external cam members having a polygonal cross-section transversely and having end surfaces facing said cam members; a cage secured to one of said housing members having polygonal openings disposed to operatively position said plungers between said cam members; said external cam member having external cam surfaces with a cross-section showing a multiplicity of similar faces; said internal cam member having internal cam surfaces with a cross-section showing an equal number of similar faces; said plungers each having a pair of grooves in those surfaces facing said cam surfaces; and a pair of hardened, rotatable, anti-frictional rollers positioned in each pair of grooves, each pair of rollers having their axes of rotation lying in a plane substantially radially aligned with the axis of rotation of said cage.

2. In a power dividing differential, the improvement comprising: an internal cam member having internal cam surfaces with a cross-section showing a multiplicity of similar faces; an external cam member having external cam surfaces with a cross-section showing an equal number of similar faces; a cage disposed between said cam members and connected to the source of power having a multiplicity of openings; plungers positioned in said openings and having surfaces directed toward said cam members; said plungers and said openings having inter-engageable surfaces; said plungers each having a pair of rollers inset in those surfaces facing said cam surfaces and rotatably mounted therein, each pair of rollers having their axes of rotation lying in a plane substantially radially aligned with the axis of rotation of said cage.

3. In a power dividing differential of the type with an internal cam member having internal cam surfaces with a cross-section showing a multiplicity of similar faces; an external cam member having external cam surfaces with a cross-section showing an equal number of similar faces; a cage disposed between said cam members and connected to the source of power, the improvement comprising: said cage having a multiplicity of openings; a multiplicity of plungers positioned in said openings and having surfaces facing said cams; said plungers each having a pair of grooves in those surfaces facing said cam surfaces; and hardened, rotatable, anti-frictional rollers positioned in each pair of grooves, each pair of rollers having their axes of rotation lying in a plane substantially radially aligned with the axis of rotation of said cage.

4. In a power dividing differential of the type having a housing formed of two housing members adapted to be secured in axial alignment; a drive gear secured to said housing; said housing members having axially aligned bearing seats formed, one on each of said members; an internal cam member journaled within one of said housing members; an external cam member journaled within the companion housing member; a plurality of parallel rows of plungers disposed between said internal and said external cam members and having surfaces facing said cam members; a cage secured to one of said housing members and disposed to operatively position said plungers between said cam members; said internal cam member having internal cam surfaces with a uniform cross-section showing a series of similar faces; and said external cam member having external cam surfaces with cross-sections showing an equal number of similar faces, one set of cam surfaces for each row of plungers and staggered one with another, the improvement comprising: said plungers each having a pair of inset hardened rollers rotatably mounted in those surfaces facing said cam surfaces, each pair of rollers having their axes of rotation lying in a plane substantially radially aligned with the axis of rotation of said cage.

HARRY M. PATCH.

References Cited in the file of this patent

UNITED STATES PATENTS

| Number | Name | Date |
|---|---|---|
| 1,836,684 | Robbins | Dec. 15, 1931 |
| 1,857,978 | Robbins | May 10, 1932 |
| 1,942,472 | Craw | Jan. 9, 1934 |
| 2,391,350 | Schmidt | Dec. 18, 1945 |
| 2,440,975 | Robbins | May 4, 1948 |

FOREIGN PATENTS

| Number | Country | Date |
|---|---|---|
| 474,560 | Great Britain | Nov. 3, 1937 |